United States Patent [19]

Kilby et al.

[11] 3,944,724

[45] Mar. 16, 1976

[54] PAGING SYSTEM WITH SELECTIVELY ACTUABLE POCKET PRINTERS

[75] Inventors: Jack S. Kilby; Robert F. Schweitzer; John McCrady, all of Dallas, Tex.

[73] Assignee: Texas Instruments Incorporated, Dallas, Tex.

[22] Filed: May 18, 1972

[21] Appl. No.: 254,668

[52] U.S. Cl. .................. 178/4.1 A; 178/30; 325/64; 325/311; 340/311

[51] Int. Cl.² .......................................... H04L 21/00

[58] Field of Search .............. 178/4.1, 30, 94, 23, 4; 325/16, 64, 55, 302, 311; 340/311, 312, 336

[56] References Cited

UNITED STATES PATENTS

| | | | |
|---|---|---|---|
| 3,147,339 | 9/1964 | Silberg | 178/4.1 R |
| 3,476,877 | 11/1969 | Perkins | 178/30 |
| 3,478,344 | 11/1969 | Schwitgebel | 325/16 |
| 3,484,550 | 12/1969 | Coulter et al. | 178/30 |
| 3,512,158 | 5/1970 | Scarbrough | 178/30 X |
| 3,515,850 | 6/1970 | Cady, Jr. | 219/216 |
| 3,521,268 | 7/1970 | Miller et al. | 340/324 |
| 3,550,001 | 12/1970 | Hanley | 325/15 |
| 3,577,137 | 5/1971 | Brennan, Jr. | 340/324 |
| 3,596,181 | 7/1971 | Dowling et al. | 325/55 |
| 3,678,391 | 7/1972 | Gough | 325/55 |
| 3,714,375 | 1/1973 | Stover | 179/2 E |
| 3,716,290 | 2/1973 | Borel | 340/336 |
| 3,739,278 | 6/1973 | Gautney et al. | 325/64 |
| 3,757,032 | 9/1973 | Minerd et al. | 178/4.1 R |

FOREIGN PATENTS OR APPLICATIONS

| | | | |
|---|---|---|---|
| 709,521 | 5/1965 | Canada | 346/76 R |

*Primary Examiner*—Thomas W. Brown
*Attorney, Agent, or Firm*—Richards, Harris and Medlock

[57] ABSTRACT

A paging system, or the like, having a transmitting station and a plurality of pocket sized subscriber units is disclosed. The transmitting station has a keyboard for encoding alphanumeric characters of a message and a subscriber code, a storage means for a predetermined number of characters of a message, means for converting a binary character code, such as ASCII, to a binary code representative of the character to be displayed in matrix form, and a format circuit for transmitting successive columns of the successive matrix code with blank columns and timing spaces therebetween to facilitate reconstruction of the subscriber code and message. Each of the subscriber units is battery powered and sized to be carried in a pocket of the user's clothing. Each pocket unit includes a receiver, means for detecting a unique subscriber code and enabling the display, for example, a non-impact type thermal printer having a single column of thermal print elements, and a system for advancing a thermally sensitive record tape past the print elements. Synchronism of such pocket printer is controlled by the format of the subscriber code and message, with blank spaces at the end of each column of data being detected to cause the print elements to be heated in accordance with the column data and then the record tape advanced one column width. A receiver having a non-printing, visual message display is also disclosed.

24 Claims, 16 Drawing Figures

PAGING SYSTEM WITH SELECTIVELY ACTUABLE POCKET PRINTERS

This invention relates generally to a system for transmitting a message to a selected individual at a remote point by a suitable transmission link, and more particularly relates to a wireless paging system of a type to be used to maintain contact with doctors, repairmen, and the like.

There are a number of systems presently in use for paging or calling selected individuals such as doctors, repairmen, servicemen, etc. Such systems usually consist of a central radio transmitter and a small receiver for each individual who is on call. When a subscriber is to be contacted, the transmitter sends a set of frequencies in the audio range to form a preselected code. Each subscriber set consists of a superheterodyne receiver, a bank of reed relays and a buzzer alarm. Each reed of the relay bank is tuned to a different audio frequency. When the frequencies received match the frequencies to which the reeds of the relay bank are tuned, the alarm is activated. In some units an audio buzzer is used, while in others a sub-audible vibration which can be felt only by the subscriber wearing the unit is produced. In every case, however, the subscriber is then expected to use a telephone to call the central station to receive his message.

Some of the disadvantages of this system are that the subscriber has no indication of the urgency of the call. Accordingly, he must assume that the call is urgent and call the central station as soon as possible to hear his message. In most cases it is necessary to make a written note of the message for future use. Some systems have been produced where a voice message is transmitted directly by the central station. These have suffer from a lack of privacy and have not been widely adopted. The alarm type systems are widely used.

This invention is concerned with a paging system which is significantly improved in that it provides a visible message for the individual subscriber as the result of a portable pocket receiving and display unit. When using such a system, the subscriber can immediately ascertain the urgency of the call without the time and inconvenience required to respond by telephone to the central office. In one embodiment, a non-impact type permanent printer is utilized so that the user also has a printed record of the call which may include an address to which a repairman, for example, is to proceed, or a telephone number which a doctor, for example, should call. In either application, the name of a customer or patient can be given and some indication made as to the nature of the customer or patient's needs, or the general urgency of the call using a code.

In another embodiment, the message is displayed in the form of alphanumeric character using matrices of light emitting diodes or of liquid crystal elements. Either embodiment thus provides a message which can be read by the subscriber, greatly reducing the possibility of error compared to an audio message.

There are many other applications where it is desirable to deliver a message in a discreet and unobtrusive manner. For example, office conferences are often interrupted by secretaries ascertaining whether or not participants in the conference wish to take a telephone call. A simple message system in accordance with the present invention could be used to indicate in an unobjectionable manner the name of a calling party and solicit a response as to whether the conferee wishes to be further interrupted.

This invention is concerned with a system comprised of a transmitting station for transmitting data representative of a subscriber code and a series of characters of a message. One or more battery powered, pocket sized receiving printer units are provided which include a radio receiver, means for detecting a unique subscriber code and producing an enable signal, and means responsive to the enable signal for thermally printing the message in dot matrix form on a thermally sensitive tape.

In accordance with one aspect of the invention, the pocket printer utilizes a unique, simple and inexpensive thermal printhead comprised of a single row of discrete semiconductor heater elements having beam leads mounted upon a suitable substrate. Each heater element includes a diffused transistor which may be independently controlled to selectively heat the elements. Because of the single column of elements, the task of individually controlling the elements is greatly simplified.

In accordance with another aspect of the invention, a unique, simple and highly reliable tape advance mechanism increments the tape past the column of heater elements column-by-column. Data defining each character as a dot matrix is generated and the column of print elements is successively activated in accordance with the columns of the matrix as the tape is indexed. In one embodiment, the unique paper advance mechanism utilizes a roller clutch, the rim of which holds the paper in thermal coupling with the thermal elements. The hub of the roller clutch is oscillated by a lever which is moved through an advance stroke by a solenoid and returned by a spring preparatory to the next advance stroke.

In the preferred form, the pocket printer utilizes a record strip accordion folded into a succession of flat reaches. The unit is designed to permit easy loading of the record tape, and the arrangement of components is such as to facilitate a compact unit suitable for being carried in the pocket of a person's clothing.

In accordance with a more specific aspect of the system of the invention, the transmitting unit preferably converts a conventional character data code having a relatively limited number of bits, such as seven, to matrix character data, typically for a $5 \times 5$ matrix having 25 bits. The matrix character data is then formated by the transmitting station as a series of binary pulses representative of successive columns of the matrix character. The pulses representative of successive columns are separated by intervals having data of a different character such as signals representative of no data, to provide timing. Conditions representative of columns of blank space are also provided between successive characters. In such a system, the pocket printer then need only detect the subscriber code, activate the column of thermal elements in accordance with the incoming data, and index the record tape in response to the blank interval between the bits of column data.

In an alternate form, the message is presented in the form of alphanumeric characters on a display. Liquid crystal displays or light emitting diode displays are suitable for this purpose. Short messages may be presented in their entirety, while longer messages will move across the display in a manner similar to that used to present the news in Times Square.

Other details of the system are claimed in this application, both in combination with the system and as subcombinations useful in other applications.

The present invention provides for the first time a portable pocket paging system which produces a readable display of the message in a discreet and unobtrusive manner. The pocket unit has a minimum of logic circuitry, and simple, light and relatively inexpensive mechanical components. The unit is very compact, lightweight, and has a low power consumption.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

DESCRIPTION OF THE FIGURES

Referring now to FIG. 1, a system for transmitting a personalized printed message is indicated generally by the reference numeral 10. The system 10 includes a message transmitting station 12 and one or more pocket printers 14. As will presently be described, the message transmitting station 12 comprises a suitable means for encoding an alphanumeric message, such as a conventional computer input-output terminal, a format generating system, and a radio transmitter for transmitting coded information representative of a subscriber code and the message. Each of the pocket printers 14 includes a radio receiver, means for detecting a particular subscriber code, and a thermal printing unit for printing the message which is enabled only when a predetermined subscriber code is detected. For most applications, each of the pocket printers 14 will have a unique subscriber code so that only one printer will print each message. For other applications, more than one, or even all of the printers may respond to a particular code.

Figure 1:
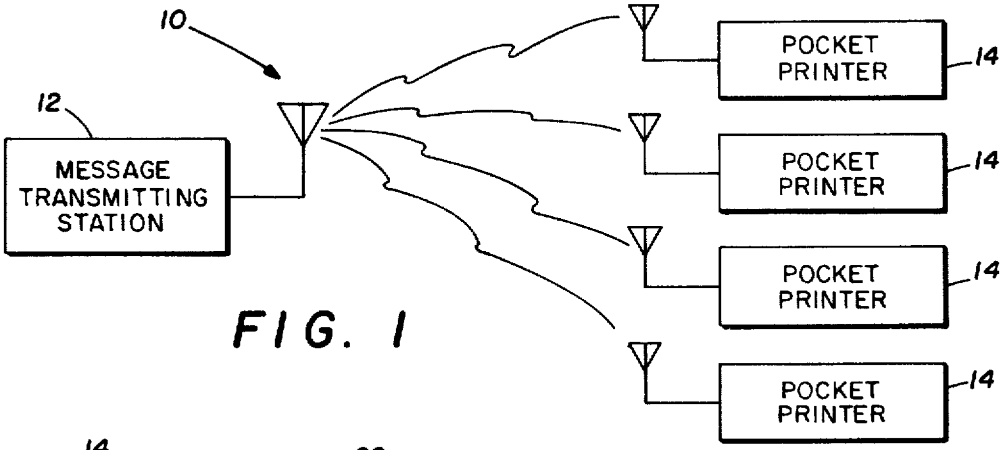
FIG. 1 is a schematic block diagram illustrating the system in accordance with the present invention.
Figure 2:
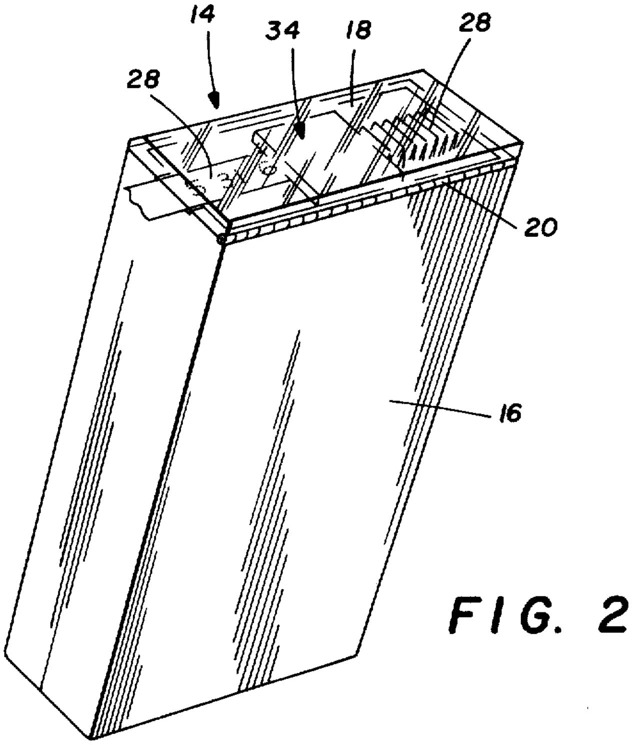
FIG. 2 is a simplified isometric of a pocket printer of the system of FIG. 1.
Figure 3:
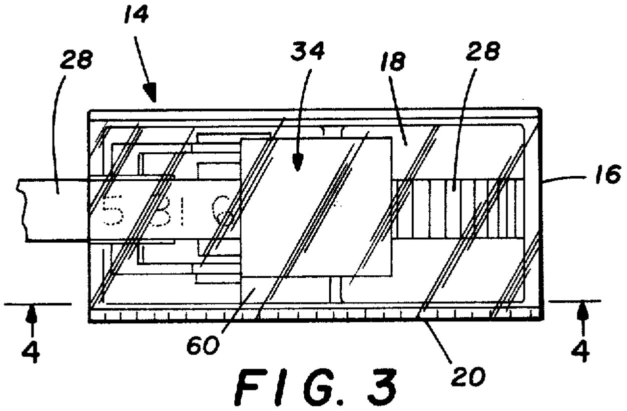
FIG. 3 is a top view of the pocket printer of FIG. 2.

A pocket printer in accordance with the present invention is indicated generally by the reference numeral 14 in FIGS. 2 and 3. The pocket printer is designed to fit in a man's shirt or coat pocket, and is approximately the size of a king-sized package of cigarettes, less than about ten cubic inches. The printer may include a generally rectangular housing 16 having a lid 18 the same size as the entire end of the housing 16. The lid 18 is connected to the housing 16 by a hinge 20 and is conveniently formed of clear plastic.

Figure 5:
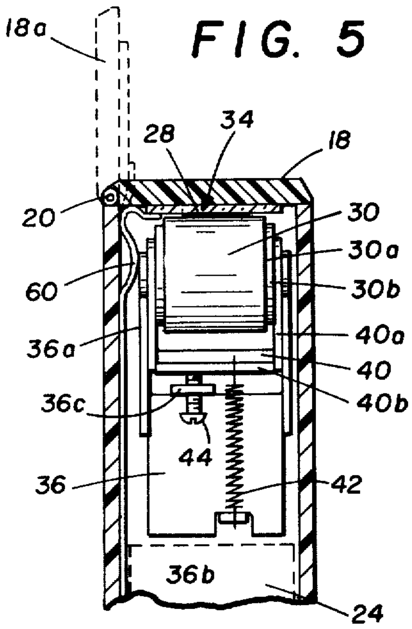
FIG. 5 is a sectional view taken substantially on line 5—5 of FIG. 4.
Figure 4:
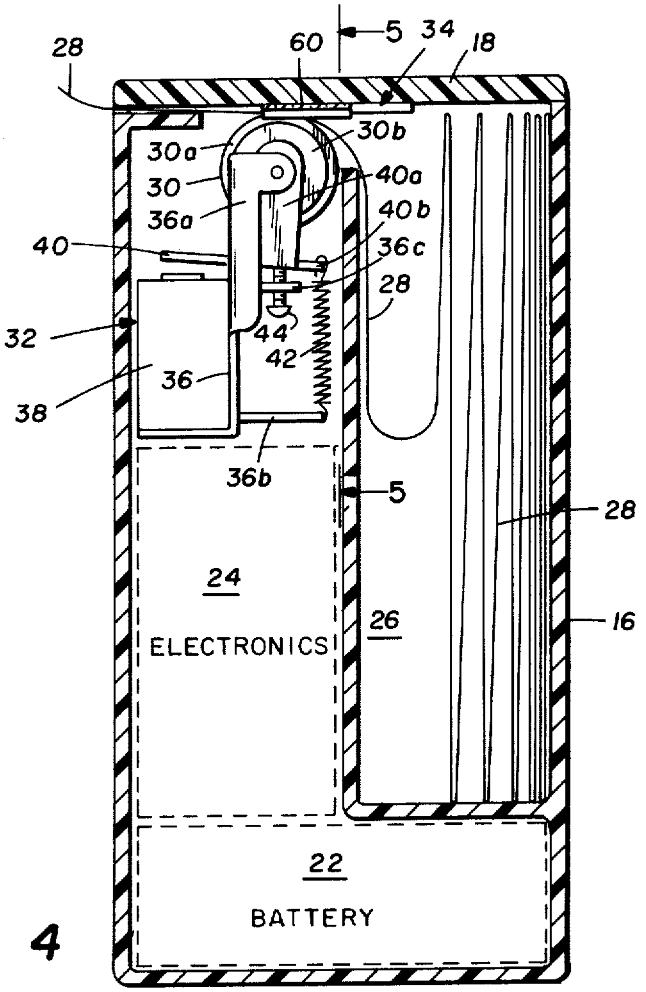
FIG. 4 is a sectional view taken substantially on line 4—4 of FIG. 3.

As best seen in FIG. 4, the housing 16 includes compartments for a battery 22 and an electronics package 24 which will presently be described in detail. The housing also forms a chamber 26 for a length of an accordion folded thermally sensitive paper tape 28. The record tape 28 passes from the chamber 26 between the roller 300 of a record advance mechanism 32 and a single column printhead assembly 34 mounted on the underside of the lid 18, then out an opening between the lid and housing. This arrangement permits a package of accordion folded record tape 28 to be easily loaded when the lid 18 is pivoted upwardly to the position **18*a* illustrated in dotted outline in FIG. 5. The record tape 28 may then be inserted in the chamber 26 with the end placed across the top of the roller 30. When the lid 18** is closed the loading operation is complete.

The record tape advance mechanism 32 is comprised of a main frame element 36 which has a yoke **36*a* supporting the roller 30. The roller 30 is a roller clutch of a conventional and well known design, such as that supplied by the Torrington Company of Torrington, Conn., as Roller Clutch RC-040708, and is characterized in that the rim 30*a* will roll freely about the hub 30*b* in a counter clockwise direction, when referring to FIG. 4, but is prevented from rolling around the hub in the clockwise direction. An oscillating plate 40 includes a pair of ears 40*a* which form a yoke which is fixed to the hub 30*b* of the roller 30. A tab 40*b* on the end of the plate 40 is connected by a spring 42 to a tab 36*b* of the main frame 36 such that the spring will bias the plate 40 to the position illustrated. An adjusting screw 44 is threaded through a tab 36*c* on the main frame 36 to limit movement of the plate 40 as a result of the action of the spring 42, and thus adjust the advancing stroke of roller 30**.

In operation, the spring 42 biases the plate 40 against the adjusting screw 44. When the solenoid 38 is energized, the plate 40 is pulled down against the armature, rotating the hub **30*b* counter clockwise. Since the rim 30*a* cannot rotate clockwise on the hub, the rim rotates counter clockwise with the hub, thus advancing the record tape 28 one increment to the left. When the solenoid 38 is deenergized, the spring 42 pulls the tab 40*b* downwardly to move the plate 40 back to the position illustrated. This moves the hub 30*b* of the roller 30 clockwise. However, since the rim 30*a* of the roller 30 is free to rotate counter clockwise relative to the hub 30*b*, the rim 30*a* remains in the advanced position as a result of the friction between the record tape 28 and the printhead 34. As will hereafter be described in detail, the record tape 28** is advanced a distance of about 0.02 inches each time the solenoid is energized.

Figure 6:
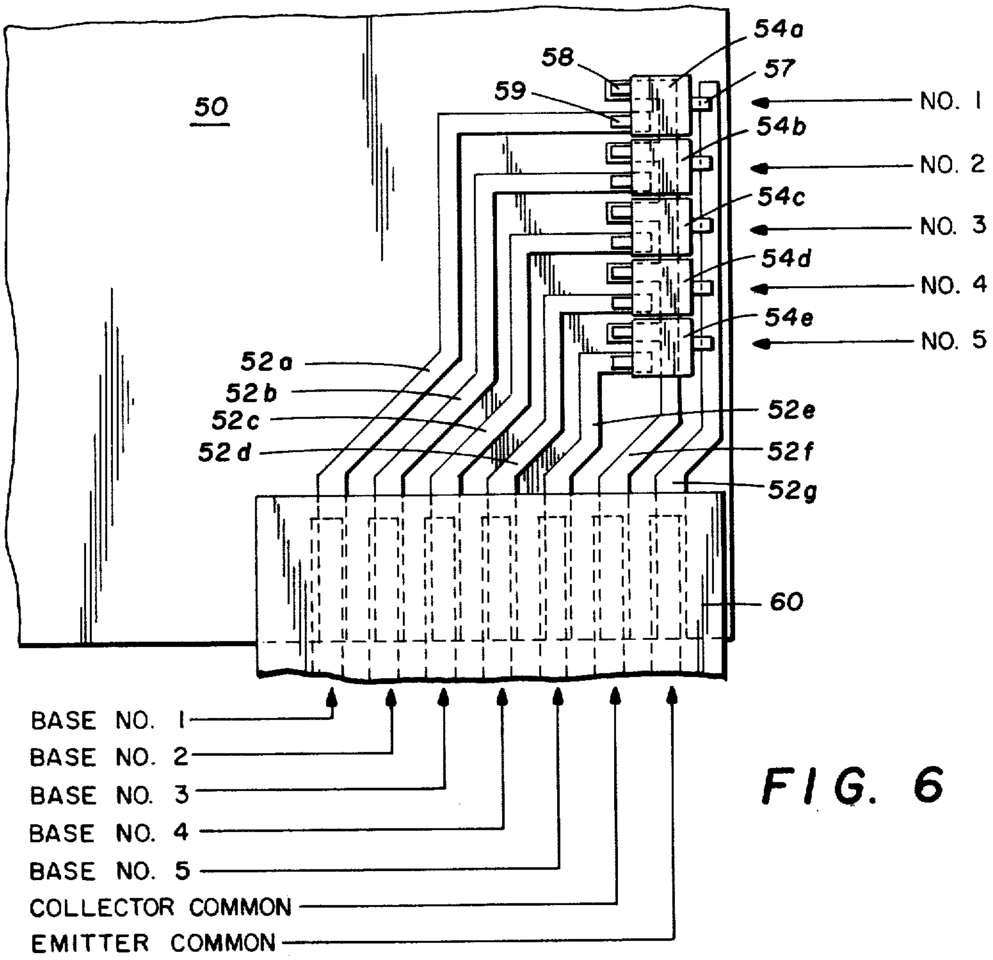
FIG. 6 is a plan view of the thermal printhead used in the device of FIG. 2.
Figure 8:
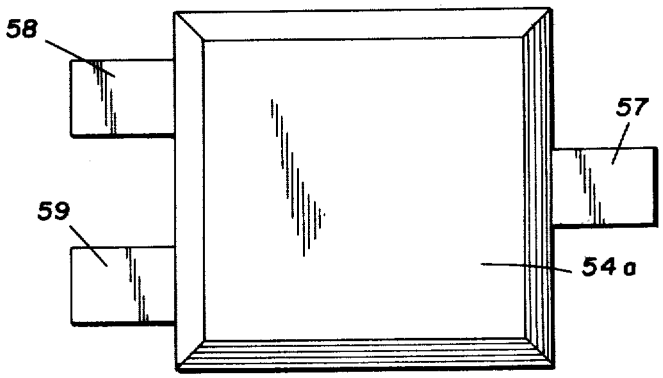
FIG. 8 is a top view of an individual thermal element of the printhead of FIG. 6.
Figure 9:
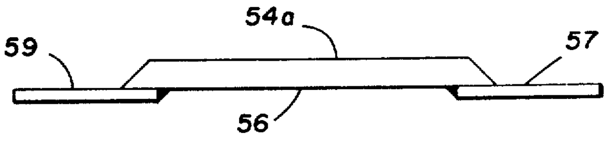
FIG. 9 is a side view of the thermal element shown in FIG. 8.

The thermal printhead 34 in accordance with this invention is illustrated in detail in FIG. 6. The printhead 34 is typically fabricated on a ceramic substrate 50, although other suitable substrates may also be employed. A plurality of printed circuit lines 52a–52g are formed on the lower face of the substrate 50 using methods which are well known in the semi-conductor industry. A plurality of heater elements 54a–54e are mounted on the substrate 50. Each of the heater elements 54a–54e is composed of a monolithic chip of semiconductor material typically about 0.023 × 0.025 × 0.005 inches in size. A transistor may be formed in face 56 of the chip adjacent the ceramic substrate 50 using diffusion and other conventional methods which are well known in the semi-conductor art. This transistor is designed to have a relatively high collector resistance so that the respective chip will be heated by collector current when the transistor is turned on by an appropriate voltage applied to its base. Although a transistor element is preferred for this application due to the smaller control currents required, it is also possible to use resistors or lossy diodes as heating elements. In these cases only two connections to each element would be required. Beam leads 57, 58 and 59 are connected to the collector, base, and emitter of the transistor formed in the face 56 of the heating element 54 by conventional beam lead methods which are also well known in the semi-conductor industry, and typically include the electro plating relatively thin metallized films formed by deposition on the surface 56 of a major slice to produce thick films, followed by a reverse etching step, in which the silicon is etched from the side opposite side 56 until the beams 57, 58, and 59 are left in the cantilevered positions illustrated.

The collector and emitter beam leads 57 and 58 of all of the elements 54a–54e are connected to conductors 52f and 52g formed on the ceramic substrate 50. The base beam leads 59 of the elements 54a–54e are connected to conductors 52a–52e, respectively. The beam leads 57–59 may be connected to the conductors 52a–52g by any suitable conventional method, such as by ultrasonic welding techniques. The semi-conductors 52a–52g are electrically connected to the electronics package 24 by a conventional flexible strap 60 having a corresponding number of conductors formed on one face and mated with the conductors 52a–52g using conventional techniques.

Figure 10:
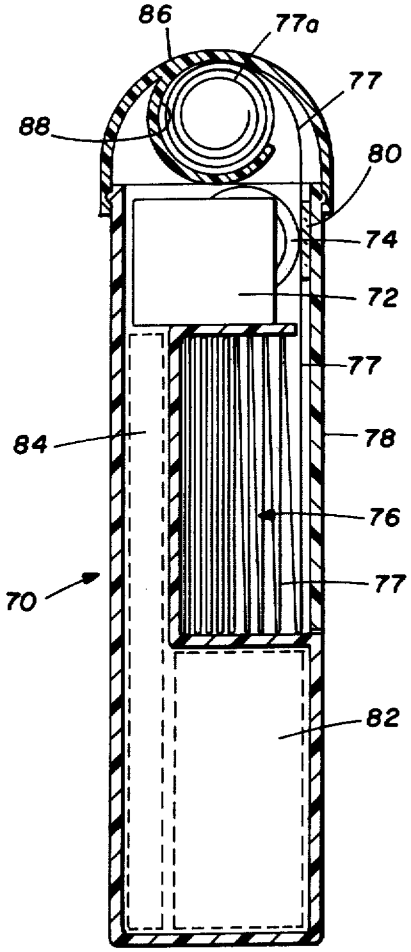
FIG. 10 is a simplified sectional view similar to FIG. 4 illustrating another pocket printer in accordance with the present invention.

An alternative embodiment of the pocket printer is indicated generally by the reference numeral 70 in FIG. 10. The pocket printer 70 includes the same components as the pocket printer 14 except that the components are rearranged to provide a relatively long, narrow unit only slightly larger size than a standard fountain pen. The pocket printer 70 includes a tape advance mechanism 72, having the roller 74. This unit may be substantially identical to the mechanism 32 of unit 14. A chamber 76, for receiving an accordion folded record tape 77, is positioned adjacent the printer 72, and both are covered by a lid 78 hinged in the same manner as illustrated in FIG. 2. A printhead 80 is mounted on the hinged lid 78. A battery 82 and electronics package 84 are positioned as illustrated. The record tape 77 is fed upwardly into a cap 86 which is snapped over the end of the printer 70 after the lid 78 is closed. The cap 86 has a circular chamber formed by wall 88 to cause the tape to coil into a convenient roll as represented by the dotted line 77a.

Figure 11:
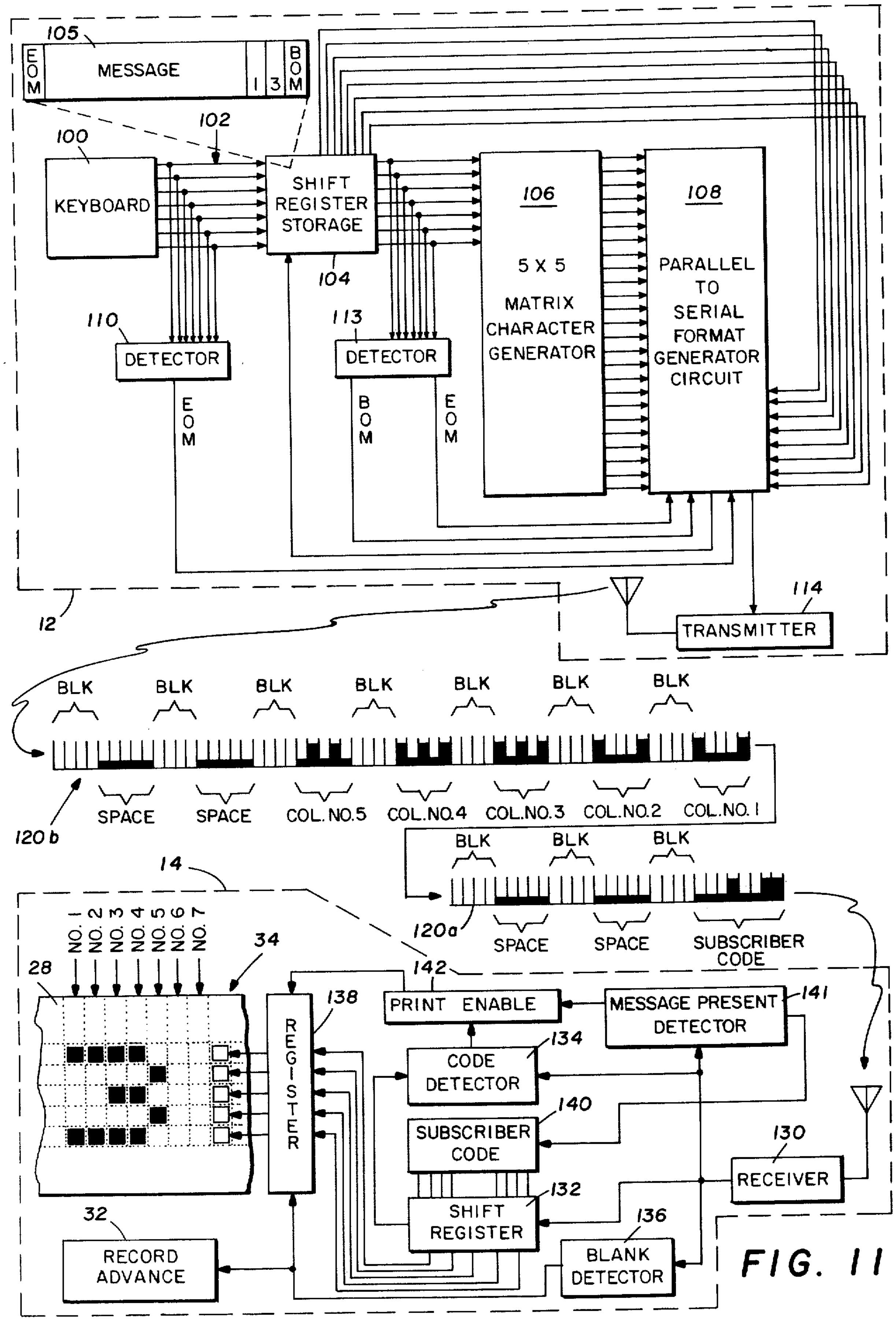
FIG. 11 is a simplified block diagram which serves to illustrate the operation of the system of FIG. 1.

The operation of the system 10, including the transmitting station 12, the pocket printer 14, and the format of the data transmitted between the two is illustrated in FIG. 11. The transmitting station 12 includes a standard keyboard 100 which may be any suitable computer input-output terminal. The keyboard 100 is characterized by a separate key for each character to be generated. When a particular key is depressed, a unique seven bit binary code is produced on outputs 102. In the specific embodiment of the present invention, it is advantageous to use a keyboard which utilizes the ASCII code.

As a message is composed, it is automatically shifted into a one hundred character, seven bit shift register storage 104. The format of the message is illustrated by data block 105. The message is comprised of approximately 100 character positions, i.e., words, each having seven bits. The first word is a "Beginning Of Message" code BOM. This is followed by a subscriber's code which identifies the particular pocket printer to be addressed. It is convenient to use numbers, such as thirty-one (31) as shown in block form, for the subscriber code. This is followed by a message comprised of alphanumeric characters of any number up to the maximum permitted by the shift register storage 104. However, regardless of the number of characters in the message, the message must always be terminated by an End of Message code EOM.

The output from the shift register storage 104 is applied to the input of a matrix character generator 106. The matrix character generator 106 converts the seven bit code representative of a particular character to 25 parallel bits each representative of a dot in a five by five matrix character, which has five columns numbered from left to right and five rows numbered from top to bottom. The output from the matrix character generator 106 is applied to a parallel to serial format generator 108.

In addition, the first four bits from the last position of the shift register storage 104, and the first four bits of the next to last position of the shift register storage 104 are multiplexed to the first eight output bits of the parallel to serial format generator 108 for purpose of sending a subscriber's code as will hereafter be described. Additional bits could be used for more complex codes if desired.

An EOM detector 110 continually monitors the seven bit word being entered into the shift register storage 104 and produces a logic signal when the EOM code is detected. A BOM and EOM detector 113 continually monitors the seven bit data word being applied to the matrix character generator 106 producing one logic signal when a BOM code is detected and another logic signal when an EOM code is detected. The outputs of detectors 110 and 113 are applied to the format generator 108. The serial output of the format generator 108 is applied to a transmitter 114.

In the operation of the transmitting station 12, the characters are compiled in the message format block 105 and are entered into the shift register storage 104 under the control of the keyboard 100 as the message is composed. When the operator strikes the end of message key, the detector 110 detects the end of message code EOM and provides a signal to the format generator 108. The format generator 108 then causes the shift register storage 104 to shift the message through the shift register until the beginning of message code BOM is detected by detector 113 and a signal supplied to the format generating circuit 108. This indicates that on the next clock pulse, the subscriber code number three (3) will be in the last position of the shift register 104 and the number one (1) in the next to the last position. The first four bits from each character, which in ASCII code fully identify the numerals, are then positioned at the first eight serial output bits of the format generating circuit 108. These are then multiplexed into the circuit 108 and serially transmitted as the first eight bits at the right hand end of data line 120*a* in FIG. 11.

In this example, each binary data bit in the serial string is simply a pulse of a suitable frequency of 0.5 milliseconds duration for a logic 0 and 1.5 milliseconds duration for a logic 1. The different pulse lengths are decoded by the pocket printer 14 as will hereafter be described in detail. The total interval of time between the start of successive data pulses is typically about 2 milliseconds.

The format generator circuit 108 next provides a blank interval, during which no pulses are transmitted, for about four pulse intervals. This is followed by five logic 0 pulses, a second blank interval four pulses wide, a second set of five logic 0 pulses, and a third blank interval four pulses wide. The format generator circuit 108 then transmits the 25 bits of the matrix character in serial fashion as indicated by the remaining portion of the data on line 120*b*. The format generator 108 transmits the five data bits representing the dots in Column 1, followed by the data for Columns 2 through 5. However, no pulses are transmitted after each column of data for a period of four normal pulses to provide a blank timing space after each column of five bits. After the five columns of the matrix character are transmitted, two columns of logic 0 bits are transmitted, each followed by four bit blank periods for timing to provide a normal space between the present character and the next succeeding character, as will presently be described.

Continuing the description of FIG. 11, the pocket printer 14 includes a receiver 130 of conventional design which detects the presence or absence of the bursts of frequency representing the data pulses and produces a single pulse at the output having a length corresponding to the particular data pulse, either about 0.5 milliseconds for a logic 0, or about 1.5 milliseconds for a logic 1. The output from the receiver 130 is connected to apply the serial data pulses to the serial input of a shift register 132, to a code detector circuit 134, to a blank detector 136, and to a message present detector 141. A hard wired subscriber code 140 is preloaded into the shift register 132 in response to the detector 141 detecting the presence of an incoming message. The serial output from shift register 132 is applied to the subscriber code detector 134, and the parallel outputs are applied to a storage register 138. The outputs of the storage register 138 control the thermal elements 54A-E of the printhead. The blank detector 136 detects the four bit blank spaces in the code and causes the register 138 to load information from the shift register 132, and also causes the paper advance mechanism 32 to advance the record 28 one column increment.

During the operation of the pocket printer 14, each of the first eight bits of the subscriber code is applied to the code detector 134. At the same time the preloaded subscriber code is shifted in synchronism from the shift register 132 to the code detector 134. The code detector 134 compares the successive bits of the incoming subscriber code with the hard wired subscriber code and in the event of a mismatch automatically disables a print enable circuit 142 and disables register 138 until the enable circuit 142 is reset by a signal from the message present detector 141. However, if no mismatch in the subscriber code is detected, the incoming data bits representative of the successive columns of the successive characters are applied to the shift register 132. The five data bits of each column are then transferred to the register 138 and the paper is advanced one column when the blank detector 136 detects the four blank spaces. This procedure is repeated until all characters of the message have been received. It will be recalled that two blank columns are provided after the five columns of each character to provide normal spacing between characters. The absence of pulses for a sufficient length of time results in the message present detector 141 preparing the system to detect the subscriber code of the next message.

Figure 12:
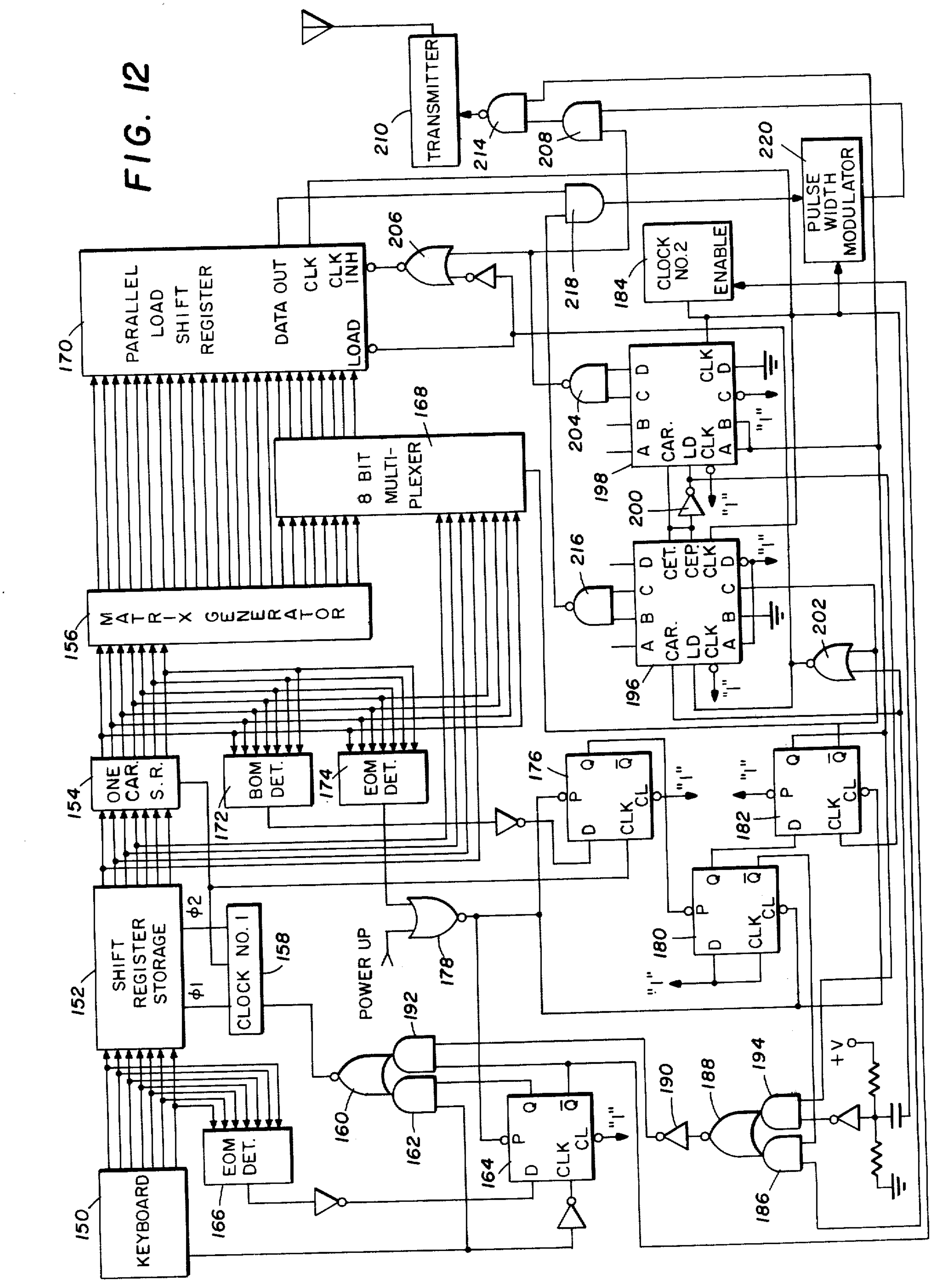
FIG. 12 is a circuit diagram of the message transmitting station of the system of FIG. 1.

A more detailed logic diagram of the message transmitting station is illustrated in FIG. 12. A keyboard 150 is used to generate a series of seven bit words each representative of a character. As previously mentioned, the ASCII code is preferred. These seven bits are applied to a shift register 152. The outputs from the shift register 152 are applied to a one character shift register 154. The outputs from the one character shift register 154 are applied to a five-by-five matrix character generator 156.

The rate at which data is shifted through the large shift register 152 and one character shift register 154 is controlled by a clock 158, which responds with one clock pulse for each output received from NOR gate 160. When characters are being input to the shift register, which will be called Mode I, the shift registers are clocked by the strobe from the keyboard through gates 162 and 160. The strobe from the keyboard 150 is gated through AND gate 162 and NOR gate 160 to cause the clock 158 to generate a clock pulse in response to the strobe from the keyboard whenever a latch 164 is in the logic 1 state. The flip-flop 164 is in the logic 1 state, which defines Mode I, until an end of message code detector 166 detects an end of code character EOM at the output of keyboard 150, at which time the flip-flop switches to a logic 0 state to start Mode II. It will be noted that the flip-flop 164 is clocked by the inverted strobe from the keyboard 150. Modes II and III are defined by the states of flip-flops 180 and 182 which control gates 186 an 194 as will presently be described.

The first four bits of the output of shift register 152 and the first four bits of the shift register 154 are applied to an eight bit multiplexer 168 together with the first eight bits of the matrix generator 156. The output of the multiplexer 168 and the last seventeen outputs of the matrix generator 156 are applied to a parallel load shift register 170. A beginning of message code detector 172 and an end of message detector 174 are both connected to the outputs of the one character shift register 154. The output from the EOM detector 174 is connected through a NOR gate 178 to the preset input of flip-flop 176 and to the clear inputs of flip-flops 180 and 182. This condition exists during both Modes I and II. The output of the BOM detector 172 is connected through an inverter to the logic input of flip-flop 176 and sets flip-flop 176 to a logic 0 state which presets flip-flop 180 to a logic 1 state to disable gate 186 and terminate Mode II. The output of gate 178 is also connected to the preset input of flip-flop 176. The other input to gate 178 is from a power up pulse generator (not illustrated) which presets the four flip-flops in the same manner as the detection of an EOM code by detector 174.

The $\bar{Q}$ output of flip-flop 164 also enables the second clock 184 when the flip-flop is in a logic 0 state. The output from clock 184 is applied to one input of AND gate 186. The $\bar{Q}$ output of flip-flop 180 is applied to the other input of gate 186. The output of gate 186 is applied through NOR gate 188 and inverter 190 to one input of AND gate 192. The other input of AND gate 192 is the $\bar{Q}$ output of flip-flop 164. The other AND gate 194 at the input of NOR gate 188 is controlled by the Q output of flip-flop 182 and the carry output of a column counter 196. The clock input of flip-flop 182 is controlled by the carry output of a data bit counter 198 which is first passed through an inverter 200.

Both the data bit counter 198 and the column counter 196 are clocked by the output of the second clock 184. Both counters 198 and 196 are automatically preloaded when a carry signal occurs through the inverter 200 and the NOR gate 202, respectively. The counter 196 is preloaded when the latch 182 is in the logic 0 state through NOR gate 202. The data bit counter 198 is an up counter which can be preloaded to a selected count by a logic 0 level applied at the load input LD. When the flip-flop 182 is in a logic 0 state, the data counter 198 is preloaded with a count which will result in a carry output after twelve clock pulses. When the flip-flop 182 is at a logic 1 state, the counter 198 is preloaded to produce a carry output signal after the counter has received nine clock pulses. The column counter 196, on the other hand, is preloaded to produce a carry signal after three clock pulses have been received when the Q output of flip-flop 182 count enable is at a logic 0 level, and is preloaded to produce a carry signal after seven clock pulses when the Q output of flip-flop 182 is in the logic 1 level.

A NAND gate 204 detects the last four counts of the data bit counter 198 prior to the carry output. The output from gate 204 inhibits the serial clock to the shift register 170 through NOR gate 206 and also inhibits the transfer of data through AND gate 208. The output of gate 208 is passed through NAND gate 214, which is enabled by the Q output of latch 182, to a transmitter 210. A NAND gate 216 decodes the last two counts of the counter 196 before a carry signal is produced. The output of NAND gate 216 disables AND gate 218 so that data from the shift register 170 cannot be applied to a pulse width modulator circuit 220. In the absence of a logic 1 level from gate 218, which indicates a logic 1 bit at the output of the shift register, the pulse width modulator 220 produces a 0 pulse upon receiving a response from clock 184. The output of the pulse width modulator 220 is applied to gate 208.

In the operation of the circuit of FIG. 12, assume that the circuit is just powered up. This produces a logic 0 at the output of NOR gate 178 which presets flip-flops 164 and 176 to a logic 1 state and clears flip-flops 180 and 182 to a logic 0 state. The logic 1 state of flip-flop 164 enables gate 162 and disables gate 192. As a result, strobe pulses from the keyboard 150 can be passed through to clock 158 to operate the shift register storage 152 and 154 in synchronism with the operation of the keyboard 150. The logic 0 state of flip-flop 180 enables gate 186, but clock 184 is disabled by the logic 0 level on the $\bar{Q}$ output of flip-flop 164. As a result of the logic 0 state of flip-flop 182, the logic 0 level on the Q output disables gate 194, sets up the preload code for counter 198 to provide a count of twelve, and disables transmit gate 214. The logic 1 level on the $\bar{Q}$ output of flip-flop 182 switches the multiplexer 168 such as to connect the lower eight input lines coming from the outputs of shift registers 152 and 154 to the shift register 170, and causes the output of gate 202 to go to a logic 0, thus enabling data to be parallel loaded into shift register 170. As a result, character data may be sequentially entered in the shift registers 152 and 154 by the keyboard 150 as a result of the strobe pulses passed through gates 162 and 160 to the clock 158. After the complete message has been entered, the operator strikes the end of message (EOM) code which is immediately detected by the end of message detector 166. The next strobe pulse produced by the keyboard 150 then causes the flip-flop 164 to switch to a logic 0 state, which causes the system to change from Mode I to Mode II operation. This disables gate 162 and enables gate 192 and the second clock 184. The pulses from the clock 184 are then passed through gates 186, 188, 190, 192 and 160 to drive the clock 158 and shift the data to the shift registers 152 and 154 at the relatively high rate of clock 184.

When the beginning of message code is positioned in the one character shift register 154, the output of the BOM detector 172 goes to a logic 1 level which is inverted and applied to the input of flip-flop 176. On the next clock pulse, the first word of the message, which is the first digit of the subscriber code, is shifted into shift register 154, and flip-flop 176 is simultaneously clocked to a logic 0 state. This immediately presets flip-flop 180 to the logic 1 state, thus disabling gate 186 to terminate the flow of clock pulses from clock 184 to clock 158 and thus stop the data flow in shift register 152 and 154. This may be considered the end of Mode II operation.

The first four bits at the output of shift register 154 together with the first four bits of the output of shift register 152 are thus definitive of the subscriber code. With the flip-flop 182 in the logic 0 state, the $\bar{Q}$ output switches the eight bit multiplexer 168 such that the eight subscriber code inputs are applied to the first eight inputs of the shift register 170. Also, the $\bar{Q}$ output is applied through NOR gate 202 to the parallel load input of shift register 170 so that this data is loaded. This input is also applied through the inverter and gate 206 to inhibit the data out clock for the shift register 170. The Q output of flip-flop 182 is at a logic 0 which disables gate 194 so that the data cannot be shifted in shift registers 152 and 154 and transmit gate 214 is disabled to prevent any transmission. In addition, the logic 0 level of the Q output of flip-flop 182 establishes a preload code for counter 198 to produce a carry signal on the count of twelve, while the $\bar{Q}$ output provides a preload code for the counter 196 to produce a carry signal on the count of three.

Since the pulses from clock 184 continue to clock the data bit counter 198, this counter proceeds through a cycle until a carry signal is applied through inverter 200 to the clock input of flip-flop 182. This signal also loads counter 196 with the count of 3 and loads counter 198 with the count of 12. When flip-flop 182 changes to a logic 1 state, the NAND gate 214 is enabled, and AND gate 194 is enabled so that carry output of the column counter 196 will now be applied to clock 158. In addition, the transmit gate 214 is enabled to permit data to be transmitted. The $\bar{Q}$ output of flip-flop 182 goes to a logic 0 so that the multiplexer 168 now connects the first eight outputs from the matrix generator 156 to the first eight inputs of the parallel load shift register 170, but the eight bits from the shift register 152 and 154 were already loaded in register 170. In addition, the logic 0 level on the $\overline{Q}$ output of flip-flop 182 allows the output of gate 202 to go to a logic 1 level to prevent parallel loading of the shift register 170 and enable gate 206 so that the pulses from clock 184 will cause the data to be shifted out of the shift register 170 to gate 218.

The first eight bits of data, which is the subscriber code, are then shifted out through gate 218 to the pulse width modulator 220. The modulated pulses are than passed through gates 208 and 214 to the transmitter 210 and are transmitted. When the counter 198 has counted eight pulses, which are the eight bits of data representative of the subscriber code, the gate 204 produces a logic 0 level for the next four clock pulses. The logic 0 level is inverted at gate 206 and inhibits the clock applied to the shift register 170 so that no more data is shifted out. The logic 0 output of gate 204 also disables AND gate 208 so that no pulses are transmitted for the four counts to provide the blank period at the end of the subscriber code.

At the end of the four counts, the counter 198 produces a carry signal which causes the counter 198 to preload to the count of nine, because the Q output of flip-flop 182 is now at a logic 1 level. Also, since the counter 196 is now within two counts of producing a carry signal, the gate 216 produces a logic 0 level which disables gate 218. As a result, the next five clock pulses result in the pulse width modulator 220 creating five successive logic 0 levels, which are transmitted to provide a spacing column at the print out. When the counter 198 reaches four counts from the carry signal, gate 204 again disables gate 208 so that no data is transmitted for four clock pulses to provide a blank interval. This cycle of transmitting five logic 0's followed by a blank interval four clock intervals long is repeated one more time as the counter 198 cycles through a count of nine, thus providing at least two additional spacing columns after the two spacing columns provided after the last character of the last message.

At this time, the counter 196 produces a carry signal which is passed through gate 202 to cause the counter 196 to load to the count of seven as a result of the logic 0 at the $\overline{Q}$ output of flip-flop 182. This carry signal is also applied as a logic 0 to cause the parallel load shift register 170 to load the 25 outputs from the matrix generator 156, which are the outputs for the first numeral of the subscriber code. The same signal, of course, inhibits the data out clock pulses to the shift register 170. The carry signal from counter 196 is also applied as a clock pulse through gate 194, which is now enabled by the logic 1 at the Q output of flip-flop 182. This pulse is applied through gates 188, 190, 192 and 160 to the clock 158 which then shifts the message in the register over one character. The counters 198 and 196 then proceed through a standard character transmission routine. The first five clock pulses result in the first column of data being clocked out of the shift register 170 and through gate 218 to the pulse width modulator 220, and thence through gates 208 and 214 to the transmitter 210. After five data pulses, the gate 204 inhibits the clock to the shift register 170 through gate 206, and disables gate 208 to prevent the transmission of any pulses for four clock intervals, thus producing the blank interval at the end of the first column of data. When the counter 198 produces a carry after nine clock pulses, the column counter 196 is incremented and the counter 198 presets to again provide a carry signal after the count of nine. The second column of five bits is transmitted in the same manner followed by a blank of four intervals. This procedure is repeated for columns 3, 4 and 5 of the first character, at which time gate 216 disables gate 218. Then the next five pulses are all logic 0's because of the logic 0 at the output of gate 218. This is followed by a blank interval four clock periods long, followed by another five logic 0's, and then another blank interval four clock pulses long, at which time column counter 196 also produces a carry signal. The two five bit intervals of logic 0's provide blank columns between adjacent characters for normal spacing.

When the counter 196 has reached the count of seven, indicating that the five columns of the character and the two blank columns for spacing have been transmitted, the carry signal of counter 196 again causes the shift register 170 to load the next character of the message as a result of the operation of gate 202 while disabling the serial output clock through gate 206, and then causes the shift registers 152 and 154 to move data up one character as a result of the clock through gate 194, etc., to clock 158. The next character is then transmitted in the same manner by cycling the counter 198 through seven cycles. During each cycle with counter 198, data is transmitted during the first five counts. During the last two cycles of the counter 198, gate 216 disables gate 218 so that all logic 0's are transmitted to provide two columns of space.

This procedure is repeated until the end of message (EOM) character is positioned in the one bit shift register 154. At that time, the EOM detector 174 produces a logic 1 output which causes the output of gate 178 to go to a logic 0. This presets flip-flops 176 and 164 to the logic 1 state, and clears flip-flops 180 and 182 to the logic 0 state in the same manner that the power up pulse did at the start of the cycle. This completes a message cycle. As previously mentioned, this condition results in the disabling of gate 214 so that the transmitter 210 cannot send any further pulses for a period of time required to enter the next message, and all components are ready for the entry of the next message by the keyboard 150.

Figure 13:
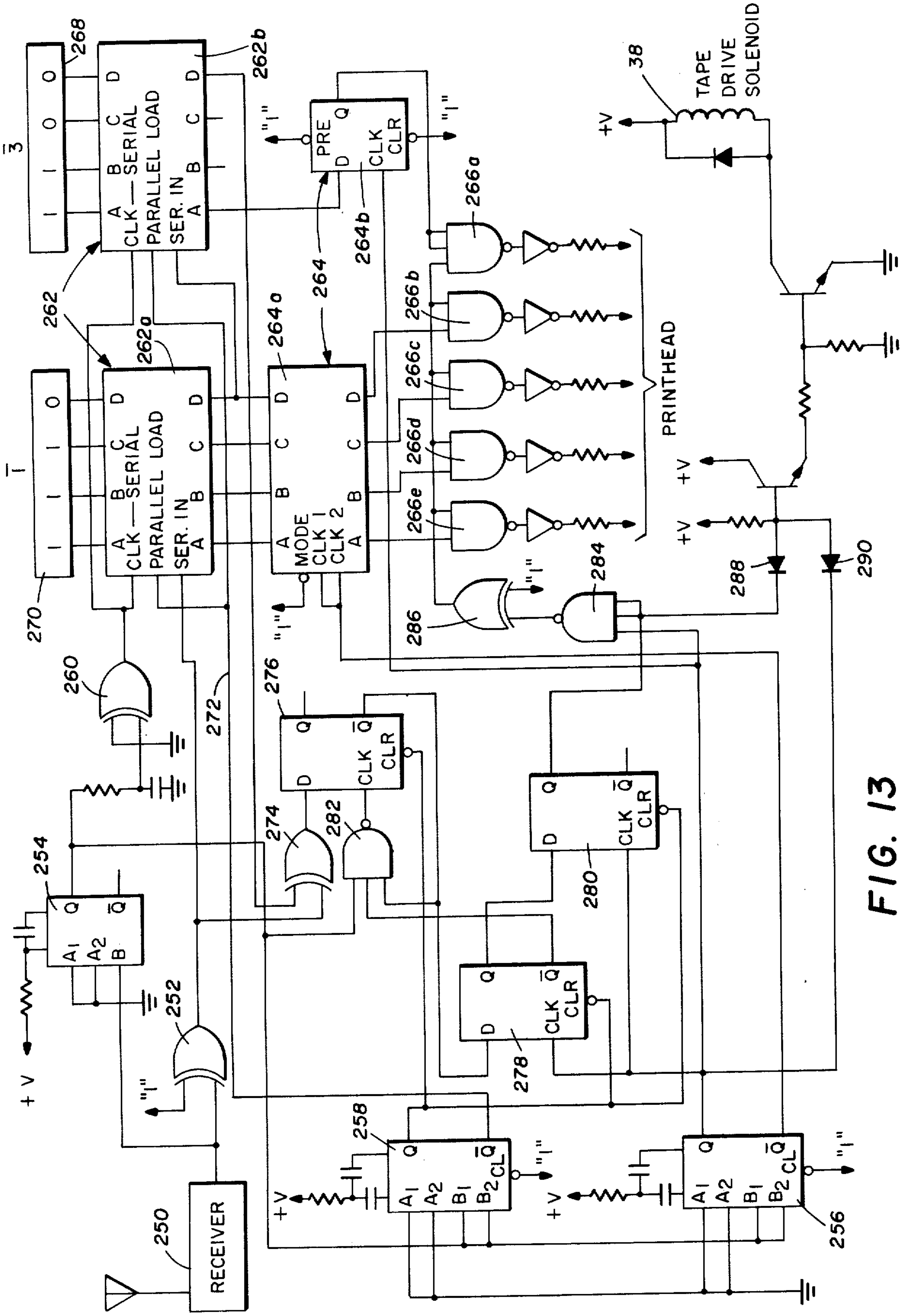
FIG. 13 is a schematic circuit diagram of a pocket printer of the system of FIG. 1.

A detailed schematic diagram of the pocket printer is illustrated in FIG. 13. A receiver 250 receives the carry signal and produces a pulse having a duration of approximately 0.5 milliseconds for a logic 0 level and approximately 1.5 milliseconds for a logic 1 level. These pulses are input through an exclusive OR gate 252 which functions merely as an inverter. The pulses are also applied to the clock input of the one-shot 254 which produces a logic 1 level at the output for approximately 1.0 milliseconds.

The trailing edge of this logic 1 level pulse is used to determine whether the incoming pulses is a logic 0 or a logic 1 as will presently be described. The trailing edge of the output from one-shot 254 also triggers a 3 millisecond retriggerable one-shot 256 and a twenty-five millisecond retriggerable one-shot 258. The three millisecond one-shot 256 is used to detect the blank space after each five bits of data for a column. The 25 millisecond one-shot 258 is used to detect the end of a message.

The output from one-shot 254 is applied through gate 260 to clock the serial shift mode of operation of a shift register 262, which is comprised of two four-bit units 262*a* and 262*b* to provide a total of eight bits. It will be noted that both units are clocked by the output from gate 260 and that the D output of the first is connected to the serial input of the second. The first five parallel outputs of the shift register 262 are applied to a five bit storage register 264, which is comprised of a four bit unit 264*a* and a single flip-flop 264*b*. The outputs from the five bit storage register 264 are applied through five NAND gates 266A-266E and sets of inverters and resisters to drive the five heating elements 54A-54E respectively.

The complement of the subscriber code is stored in two four-bit hard-wired registers 268 and 270 to provide parallel loading to the shift register 262. The complements of the first numeral of the subscriber code is contained in register 268 and is shifted into the four bits of shift register 262*b*. The complement of the four bit code for the second numeral of the subscriber code is shifted into the four digits of shift register 262*a* from register 270. The parallel load occurs when clock input 272 transitions from a logic 1 level to a logic 0 level.

The serial output of shift register 262 is applied as one input to an exclusive OR gate 274. The other input to the exclusive OR gate is the output from the inverting gate 252. The output from the gate 274 is applied to the data input of flip-flop 276. The $\bar{Q}$ output of flip-flop 276 is connected to the data input to a second flip-flop 278. The Q output of flip-flop 278 is in turn connected to the data input of a third flip-flop 280. All three flip-flops 276, 278 and 280 are set to a logic 0 level when the true output of one-shot 258 transitions from a logic 1 to a logic 0 level. The flip-flop 276 is clocked when the output of NAND gate 282 transitions from a logic 0 level to a logic 1 level. This occurs as a result of the output of one-shot 254 transitioning from a logic 1 level to a logic 0 level when the gate 282 is enabled by both flip-flops 276 and 278 being in a logic 0 state, so that both $\bar{Q}$ outputs are at a logic 1 level.

The true output of flip-flop 280 is connected through a NAND gate 284 and an exclusive OR gate 286 which is used merely as an inverter to enable NAND gate 266A-266E whenever flip-flop 280 is in the logic 1 state. Gate 284 produces a print enable signal whenever the output of flip-flop 280 and one-shot 256 are at a logic 1 level. The record strip advance solenoid 38 is energized whenever a logic 1 level is applied to both diodes 288 and 290 as a result of flip-flop 280 being in the logic 1 state and one-shot 256 being at the logic 0 state.

In the operation of the circuit of FIG. 13, assume that no data pulses have been received by the receiver 250 for a period of at least 25 milliseconds so that the end of message one-shot 258, and of course the end of column one-shot 256 and the data bit one-shot 254 are all in the logic 0 state. The logic 1 level on the $\bar{Q}$ output of one-shot 258 thus causes the complement of the subscriber's code in registers 268 and 270 to be loaded into the shift register 262. The logic 0 level on the Q output of one-shot 258 clears flip-flops 276, 278 and 280 to the logic 0 state. The logic 0 of the Q output of one-shot 256 disables gate 284 so that all of the NAND gates 266A-266E are also disabled. The $\bar{Q}$ output of one-shot 256 is at a logic 1 level, and the Q output of one-shot 256 provides a logic 0 at the clock input of the flip-flop 264*b* to prevent data being loaded into the register.

When the first positive going pulse is output from the receiver 250 in response to an incoming data pulse, the positive going edge triggers the one-shot 254. The positive going data is also inverted and applied to an input of exclusive OR gate 274. The first preloaded bit of a subscriber's code is output from the shift register 262 to the other input of exclusive OR gate 274. Since the subscriber's code loaded in the shift register 262 is the complement, each of the successive bits should be different if the incoming code is the subscriber code for this particular unit. Assuming the first bits are different, the output from gate 274 will be in a logic 0 when the gate 282 is clocked at the end of 1 millisecond by the negative going edge of the pulse from one-shot 254. As a result, the flip-flop 276 will remain in the logic 0 state. The trailing edge of the pulse from one-shot 254 also clocks the shift register 262 to advance the complement subscriber code bits one position to the right. If all eight of the incoming bits representing the subscriber code are different from the complement eight bits shifted from the shift register 262, the flip-flop 276 remains in the logic 0 state.

However, the first bit that is the same, indicating that the incoming code is different from the hard wired subscriber code, the gate 274 produces a logic 1 output which results in flip-flop 276 switching to the logic 1 state. The logic 0 at the $\bar{Q}$ output of flip-flop 276 then disables gate 282 so that no further clock pulses can be applied to the flip-flop 276, and it remains in the logic 1 state until the message is over and one-shot 258 again clears flip-flop 276 to a logic 0 state. The logic 0 level on the $\bar{Q}$ output of flip-flop 276 also provides a logic 0 level at the data input of flip-flop 278 to prevent this flip-flop 278 from erroneously changing to a logic 1 state and allowing a print cycle to possibly occur.

Assume that all eight digits of the subscriber's codes favorably compare so that flip-flop 276 remains in a logic 0 state. So long as data pulses are coming in at a rate greater than 1 every 3 milliseconds, one-shot 256 remains in the logic 1 state. However, during the first blank interval after the eight subscriber code bits have been receivied, which blank interval is four data bits long, one-shot 256 times out and reverts to the logic 0 state. When the $\bar{Q}$ output of one-shot 256 goes to a logic 1 level, flip-flop 278 will be switched to a logic 1 state, it is assumed that the flip-flop 276 will remain in the logic 0 state indicating that the correct subscriber code was received. The $\bar{Q}$ output of flip-flop 278 then disables gate 282 so that flip-flop 276 is no longer operative. However, flip-flop 280 remains in the logic 0 state so that print gate 284 remains disabled, and the solenoid 38 remains disabled because of the logic 0 level at diode 288. One-shot 258 remains active.

When the next string of five logic 0 pulses are received, which are all logic 0 pulses, one-shot 254 is again fired by the leading edge of the first pulse. The 25 millisecond one-shot 258 is still in the logic 1 state, and the three millisecond one-shot 256 is again triggered by the leading edge of that first pulse from one-shot 254. The only event that occurs at the end of each of the five data pulses is that the data pulse is decoded as it is clocked into shift register 262 by the trailing edge of the pulse from one-shot 254. This occurs because a logic 0 bit applied at the serial input of the shift register 262 reverts to a logic 0 level after about 0,5 milliseconds so that when the trailing edge of the 1 millisecond one-shot occurs, a logic 0 is shifted into the shift register. However, if a logic 1 pulse of 1.5 milliseconds is applied from gate 252, then the input is at a logic 1 level when a trailing edge occurs, so that a logic 1 is input to the shift register. After the five bits, in this case all logic 0, are shifted into the shift register 262, the blank interval causes the 3 millisecond one-shot 256 to time out. This loads the five bits in shift register 262 into storage register 264 and also clocks flip-flop 280 to the logic 1 state as a result of the logic 1 level at the data input, thus enabling gate 284 and gates *266a–266e*. The logic 0 of the just received data is then applied to the five print elements, which remain "off" because of the logic 0 state.

The gate formed by diodes 288 and 290 was also enabled when flip-flop 280 was switched to a logic 1 state. Thus, at the beginning of the next five bits of data, the leading edge of the pulse from the one-shot 254 again triggers the three second one-shot 256 to a logic 1 state. This back biases diode 290 and causes the drive solenoid to be energized, thus indexing the record tape. At the same time, gate 284 is enabled, which causes the data transferred to the register 264 when the one-shot 256 previously timed out to be applied to the elements of the printhead. Thus, those bits of the storage register 264 which are a logic 1 level then turn the transistors of the heater elements **54*a*–54*e*, respectively, on, to cause heating of a local spot on the paper. After the next 5 bits of common data are introduced to the register 262, the 3 millisecond one-shot 256 again times out. The switch of a Q output from the logic 1 to the logic 0 state disables gate 284, and thus gates 266A–266E, and also deenergizes solenoid 38 by taking the back bias off diode 290. In addition, the switch of the $\overline{Q}$ output to a logic 1 state clocks register 264** to transfer the new data into the register.

Since the remaining portion of the data message transmitted is a series of nine bit words containing five data pulses followed by four clock intervals with no pulses, the operation of the circuit of FIG. 13 is repeated. That is, the first data pulse of each set of five triggers one-shot 256 on, thus energizing the solenoid 38 to immediately index the paper and also enabling the print gates *266a–266e* to cause the values stored in register 262 to be printed by energizing the thermal elements of the printhead. When the one-shot 256 times out during the blank interval after the five data bits, the new data in shift register 262 is transferred to the storage register 264 as the gates *266a–266e* are disabled and the solenoid 38 deenergized.

At the conclusion of the message when no further data bits are received, the 25 millisecond one-shot 258 times out. This resets flip-flops 276, 278 and 280 to the logic 0 state and stores the complement of the subscriber code into shift register 262. This prepares the circuit to receive and compare the subscriber code at the front of the next message with the stored code. From the preceding detailed description of the preferred embodiment of the invention, it will be appreciated that a highly unique system for delivering a printed message to a selected individual has been described. The system utilizes a very small, portable pocket printer. As a result of the unique format generating system, the pocket printer can utilize a unique and relatively inexpensive thermal printing device which is particularly adapted to miniaturization. The unique printing device has the capability of utilizing accordion folded record paper since it prints only one column at a time, thus providing maximum storage capacity for a given area. In addition, the pocket printing circuit has a minimum amount of circuitry and is timed entirely from the received message. The pocket printer has a unique arrangement of components which permits it to be packaged in a minimum space. In addition, the arrangement of components permits the unit to be easily loaded with the record tape.

Figure 14:
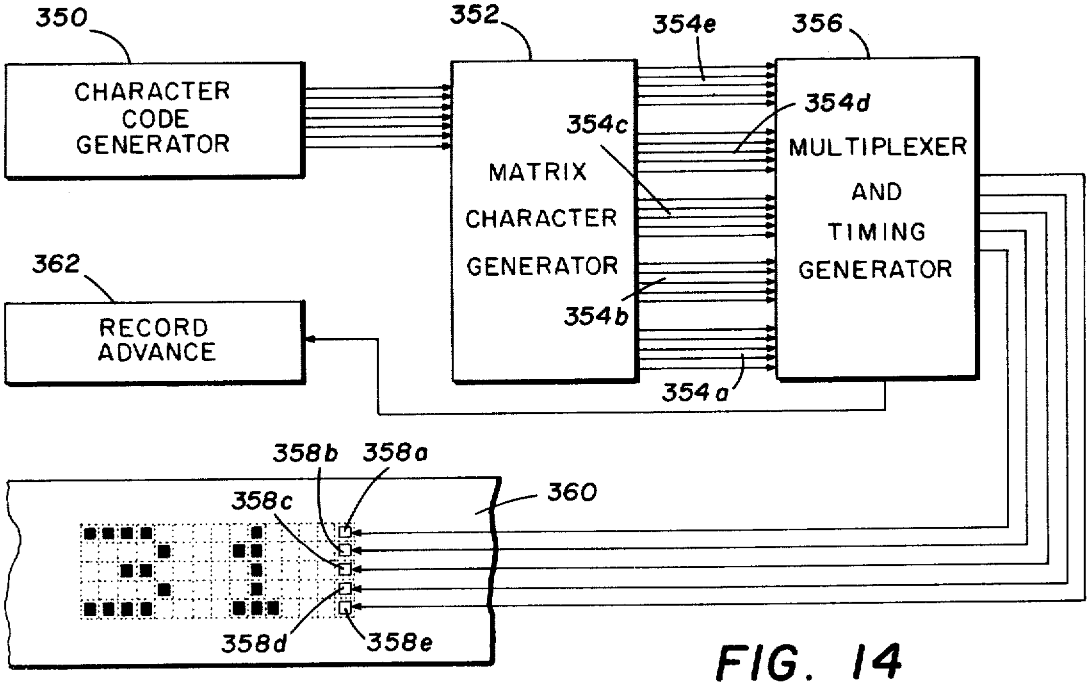
FIG. 14 is a block diagram of another printing system in accordance with the broader aspects of the present invention.
Figure 7:
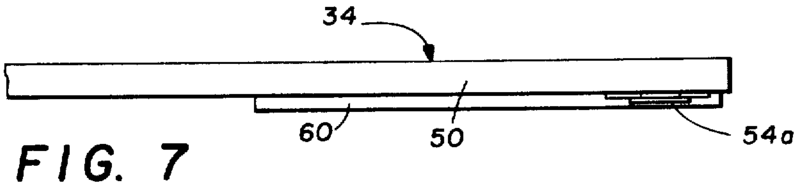
FIG. 7 is a side view of a thermal printhead of FIG. 6.

Although the specific embodiment of the invention heretofore described is particularly suited to the transmission of data serially one bit at a time, it is to be understood that within the broader aspects of the invention, other means of data transmission may be employed. For example, more conventional codes, such as the ASCII code, may be used to transmit the characters with a minimum number of bits, and these bits may be transmitted either serially or in parallel. In such a case, it is still desirable to use the simplified printing technique heretofore described. In such a system, however, the matrix character data could be generated in the receiving unit utilizing a system similar to that illustrated in FIG. 14. In such a system, the radio receiver would receive data representative of the character but having fewer bits. The receiver would generate this code as seven parallel bits of information as represented by the character code generator 350. These outputs would then be applied to a matrix character generator 352 which would produce, for a five by five character matrix, 25 outputs which could be grouped in five columns 354A–354C. A suitable multiplexer and timing generator 356 would then sequentially apply these sets of five logic levels each representing a column to a column of five printing elements 356A–358E, respectively, so that a column of dots would be formed upon a record strip 360. The multiplexer and timing generator 356 would also activate a record advance mechanism 362 which would advance the record strip 360 so that successive columns would be imprinted on the record strip 360 to establish the printed message. It will also be appreciated that the method and system of the present invention could be used generally in facsimile transmission where the number of print elements in a column extending transversely of the movement of the record paper could be increased as required.

Figure 15:
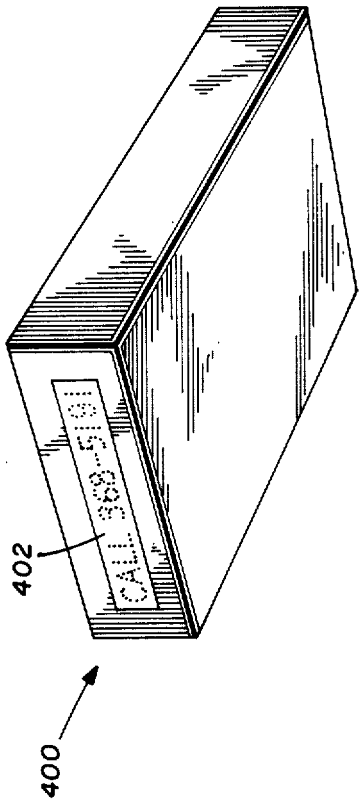
FIG. 15 is a simplified isometric view of a pocket unit with a light emitting diode display.
Figure 16:
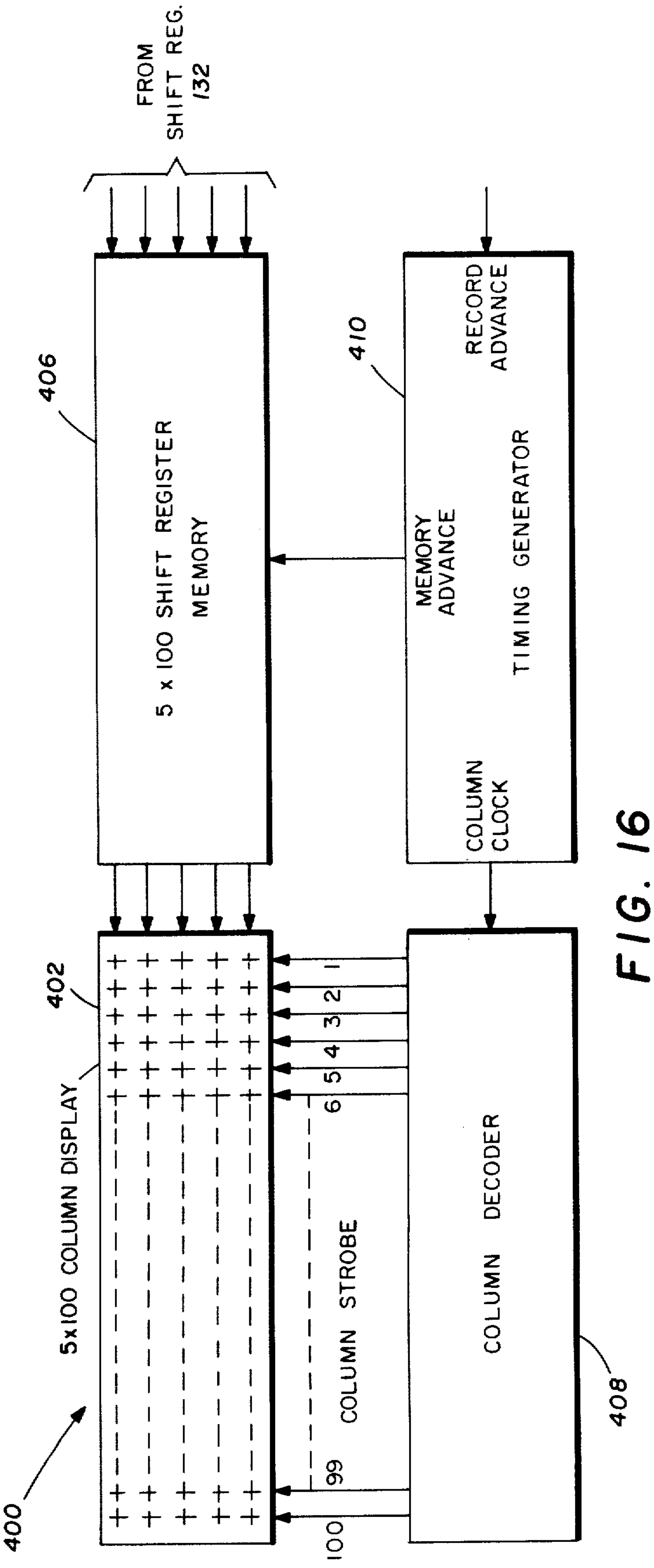
FIG. 16 is a schematic circuit diagram of the unit of FIG. 15.

In the preferred embodiment, a non-impact type permanent printer, i.e., a thermal printer, has been described. However, temporary displays such as visible light emitting diode (VLED) and liquid crystal displays may be utilized in certain cases. Such a system is indicated generally by the reference numeral 400 in FIGS. 15 and 16. The device 400 may be housed in a package similar to that heretofore described except that an alphanumeric display 402 is provided as a visual message read-out. As mentioned, the read-out 402 may be formed of visible, light emanating diodes or liquid crystals arranged in a suitable matrix such as a 5 × 5 dot matrix or an eight segment matrix for producing the desired alphanumeric characters. For the present application, the elements are arranged in a 5 × 5 dot matrix. The display 402 is illustrated as having 100 columns, thus providing about fifteen five-column characters with two-column spacing.

The unit 400 may have circuitry identical to the circuitry illustrated in FIG. 11 up to the register 138. The remainder of the circuitry is illustrated in the block diagram of FIG. 16. The output from the shift register 132 is applied to a 5 × 100 bit shift register memory 406. The shift register memory 406 is a recirculating memory, typically of the dynamic type, in which information is continuously shifted. The output from the memory 406 is applied to the row inputs of display 402. A column decoder 408 is in effect a multiplexer which applies the data at the output of the memory 406 to a selected single column of the display 402.

A timing generator 410 controls the operation of the shift register 406 and the column decoder 408 in a manner to input data from the register 138 as the last bit of the recirculating message in the memory 406 each time a signal is received from the blank detector 136 indicating that a new column of data has been input to the register 138. The timing generator 410 also synchronizes the operation of the shift register memory 406 and the column decoder 408 so that the column data at the output of the memory 406 is multiplexed to the appropriate column of the display 402. The recirculation of column data with the memory 406 is at a rate of at least one recycle for each incoming column of data applied to the register 138. The timing generator 410 detects the position of the last column in which data was entered in register 406 and enters the new data from shift register 132 in the next succeeding column. As a result, the incoming message is continually displayed as it is received. In the event the incoming message is longer than the shift register 406 and display 402, the message can be moved from left to right across the display, leaving the last 15 characters of the message as a semipermanent record if desired.

Although preferred embodiments of the invention have been described in detail, it is to be understood that various changes, substitutions and alterations can be made therein without departing from the spirit and scope of the invention as defined by the appended claims.

What is claimed is:

1. A system for communicating an alphanumeric message to a selected receiver unit comprising:

a. means for compiling and transmitting by radio successive multicharacter alphanumeric messages in dot matrix format, each preceded by selected unit address code, said means including means to transmit sets of sequential data pulses, each pulse representing one of two states, with predetermined time spaces between said sets where each set represents a dot matrix column for a character display, b. a plurality of unitary portable units each having a housing and including a radio receiver means for receiving said address codes and said messages, c. visual display means in each of said units each including a single column of elements for producing, column at a time, visible fractions of characters to be displayed in dot matrix form in response to receipt of each set of said pulses, d. means responsive to said address code designating a selected receiver to enable said elements to respond to the message which follows said address code, and e. timing means responsive to the occurrence of each of said time spaces between said sets to increment the display of said messages a distance corresponding to one matrix column width whereby multiple increments are produced where any said set comprises only pulses representing the second of said two states.

2. The combination set forth in claim 1 in which said single column of elements is mounted on a movable portion of said housing where said elements are inwardly facing and means are provided for moving a paper strip past said elements in response to each of said sets of said pulses.

3. The combination set forth in claim 1 in which said single column of elements is mounted inwardly facing on a transparent cover of said housing and is movable into and out of engagement with a record receiving element at a print station in said housing to provide for production of a printed message the existence of which may be ascertained from the view through said cover.

4. The system of claim 1 wherein said display means comprises a permanent record display of said message.

5. The system of claim 4 wherein said display means comprises a nonimpact type printer.

6. The system of claim 5 wherein said nonimpact type printer comprises a strip of thermally sensitive paper and electrically energizable heating elements for printing a single row of characters extending along the length of the strip of paper.

7. The system of claim 1 wherein said display means comprises means for temporarily displaying said message as a single row of characters.

8. The system of claim 6 wherein:

the means for compiling and transmitting the message of alphanumeric characters produces a series of sets of binary coded pulses, each set being representative of a column of a dot matrix displaying the respective characters, and each printer includes a single column of said heating elements extending transversely of a record strip for printing column at a time an alphanumeric character in dot matrix form, means for successively energizing the heating elements in response to the coded pulses of the successive sets of binary coded pulses, and means for moving the record strip in synchronism with the energization of the heating elements such that successive columns of the dot matrices will be disposed in adjacent relationship to produce the characters.

9. The system of claim 1 wherein the means for compiling and transmitting a message of alphanumeric characters preceded by a prescribed code comprises:

keyboard means for producing an alphanumeric code in response to the depression of a key for each alphanumeric character of a message, shift register storage means for storing a plurality of characters successively encoded by the keyboard means, matrix character generator means for successively producing a set of binary logic signals representative of the condition of the dots in a matrix to visually present the characters represented by the alphanumeric codes successively output from the shift register storage means, and format means for serially transmitting the logic signals output by the matrix character generator means in a predetermined format.

10. The system of claim 9 wherein:

the format means includes means to transmit a series of sets of data pulses representative of the conditions of dots of a column of dots in the matrix and means to transmit representations of two blank data columns following the last set of each character, and means to space each set of data pulses by a predetermined time interval to signify the end of each set of data pulses and responsive to occurrence of time intervals following receipt of said representations to provide spaces between adjacent characters.

11. The system of claim 9 wherein:

the format means includes means first to transmit a subscriber code derived from the first two characters output from the shift register storage means, and means then to transmit representations of the characters in accordance with a dot matrix format.

12. The combination of claim 1 in which means in each said unit reject messages not preceded by the address code unique thereto.

13. The combination set forth in claim 1 in which said selected unit is of pocket size of less than ten cubic inches and includes said single column of elements mounted adjacent to a paper supply receptacle and further includes means to step a paper strip past and in contact with said elements.

14. A system for communicating an alphanumeric message to a selected receiver unit comprising:

a. means for compiling and transmitting by radio successive multicharacter alphanumeric messages in dot matrix format, each preceded by a selected unit address code, said means including means to transmit sets of sequential data pulses with predetermined time spaced between said sets where each set represents a dot matrix column of a character to be displayed, b. a plurality of unitary portable units each including a radio receiver means for receiving said address codes and said messages as logic signals, c. a single column of heating elements controllable by a set of logic signals for producing, column at a time, fractions of characters to be displayed in dot matrix form, d. thermally sensitive record means movable transversely of the column of heating elements, e. means responsive to said address code designating a selected receiver unit to enable said elements to respond to the message which follows said address code, f. storage means for a plurality of logic signals corresponding to the number of said heating elements, the logic signals selectively controlling the energization of said heating elements, g. a shift register having a number of bits corresponding to the number of logic signals stored in the storage means for receiving a series of incoming data signals representing said message, h. means for detecting a unique signal indicating that a number of data signals corresponding to the number of bits of the shift register have been received in the shift register and for then causing the data signals in the shift register to be transferred to the storage register and the heating elements to be energized in accordance therewith to produce a character in dot matrix form on said record means, and i. timing means responsive to said time spaces between said sets to increment the display of said messages a distance corresponding to one matrix column width.

15. The system of claim 14 wherein:

the incoming data signals are binarily coded signals and the unique signal is an absence of transmission for a predetermined period of time.

16. The system of claim 14 further characterized by:

means in said receiver for loading a predetermined subscriber code into a shift register, means for serially clocking the subscriber code from the shift register in synchronism with an incoming series of binarily coded data signals, and comparator means for comparing the subscriber code binary signals clocked from the shift register with the incoming binary signals and for disabling the printing system in the event of a predetermined mismatch of any two binary signals.

17. A system for communicating an alphanumeric message to a selected receiver unit comprising:

a. means for compiling and transmitting by radio successive multicharacter alphanumeric messages in dot matrix format, each preceded by a selected unit address code, said means including means to transmit sets of sequential data pulses with predetermined time spaced between said sets where each set represents a dot matrix column of a character to be displayed, including i. keyboard means for producing an alphanumeric code in response to the depression of a key for each alphanumeric character of a message, ii. shift register storage means for storing a plurality of characters successively encoded by the keyboard means, iii. matrix character generator means for successively producing a set of binary logic signals representative of the condition of the dots in a matrix to visually present the characters represented by the alphanumeric codes successively output from the shift register storage means, and iv. format means for serially transmitting the logic signals output by the matrix character generator means in a predetermined format having means to transmit a series of sets of data pulses representative of the conditions of dots of a column of dots in the matrix with means to space each set of data pulses by a predetermined time interval to signify the end of each set of data pulses, means to establish two blank data columns following the last set of each character, b. a plurality of unitary portable units each including a radio receiver means for receiving said address codes and said messages, c. a single column of heating elements controllable by a set of logic signals for producing, column at a time, fractions of characters to be displayed in dot matrix form, d. thermally sensitive record means movable transversely of the column of heating elements, e. means responsive to said address code designating a selected receiver unit to enable said elements to respond to the message which follows said address code, f. further storage means for a plurality of logic signals corresponding to the number of said heating elements, the logic signals selectively controlling the energization of said heating elements, g. a shift register having a number of bits corresponding to the number of logic signals stored in the storage means for receiving a series of incoming data signals representing said message, h. means for detecting a unique signal indicating that a number of data signals corresponding to the number of bits of said shift register storage means have been received in the said shift register and for then causing said data signals in the shift register to be transferred to said further storage means and the heating elements to be energized in accordance therewith to produce a fraction of a character on said record means, and i. timing means operative upon each occurrence of said time spaces between said sets to increment the display of said messages a distance corresponding to one matrix column width and to increment the display of said messages multiples of said distance upon receipt of said blank data columns.

18. In a system for communicating an alphanumeric message to a selected receiver unit which includes means for compiling and transmitting by radio successive multicharacter alphanumeric messages in dot matrix format, each preceded by a selected unit address code, said means including means to transmit sets of sequential data pulses with predetermined time spaced between said sets where each set represents a dot matrix column of a character to be displayed, the improvement comprising:

a. a unitary portable unit including a radio receiver means for receiving said address codes and said messages to produce sets of logic signals representative of said messages, b. a single column of heating elements controllable by a set of logic signals for producing, column at a time, fractions of characters to be displayed in dot matrix form, c. thermally sensitive record means movable transversely of the column of heating elements, d. means responsive to said address code designating a selected receiver unit to enable said elements to respond to the message which follows said address code, e. storage means for a set of said logic signals corresponding to the number of said heating elements, the logic signals selectively controlling the energization of said heating elements, f. a shift register having a number of bits corresponding to the number of logic signals stored in the storage means for receiving a series of incoming data signals representing said message, g. means for detecting a unique signal indicating that a number of data signals corresponding to the number of bits of the shift register have been received in the shift register and for then causing the data signals in the shift register to be transferred to the storage means and the heating elements to be energized in accordance therewith to produce a character in dot matrix form on said record means, and h. timing means responsive to the occurrence of said time spaces between said sets to increment the display of said messages a distance corresponding to one matrix column width.

19. In a system for communicating an alphanumeric message to a selected receiver unit having means for compiling and transmitting by radio successive multicharacter alphanumeric messages in dot matrix format, each preceded by a selected unit address code, said means including means to transmit sets of sequential data pulses with predetermined time spaced between said sets where each set represents a dot matrix column of a character to be displayed, including i. keyboard means for producing an alphanumeric code in response to the depression of a key for each alphanumeric character of a message, ii. shift register storage means for storing a plurality of characters successively encoded by the keyboard means, iii. matrix character generator means for successively producing a set of binary logic signals representative of the condition of the dots in a matrix to visually present the characters represented by the alphanumeric codes successively output from the shift register storage means, and iv. format means for serially transmitting the logic signals output by the matrix character generator means in a predetermined format having means to transmit a series of sets of data pulses representative of the conditions of dots of a column of dots in the matrix with means to space each set of data pulses by a predetermined time interval to signify the end of each set of data pulses, means to establish two blank data columns following the last set of each character, the improvement comprising:

a. a unitary portable unit including a radio receiver means for receiving said address codes and said messages to produce logic signals representative of said messages, b. a single column of heating elements controllable by a set of said logic signals for producing, column at a time, fractions of characters to be displayed in dot matrix form, c. thermally sensitive record means movable transversely of the column of heating elements, d. means responsive to said address code designating a selected receiver unit to enable said elements to respond to the message which follows said address code, e. further storage means for a set of said logic signals corresponding to the number of said heating elements, the logic signals selectively controlling the energization of said heating elements, f. a shift register having a number of bits corresponding to the number of logic signals stored in the further storage means for receiving a series of incoming data signals representing said message, g. means for detecting a unique signal indicating that a number of data signals corresponding to the number of bits of the shift register have been received in the shift register and for then causing the data signals in the shift register storage means to be transferred to the further storage means and the heating elements to be energized in accordance therewith to produce a character in dot matrix form on said record means, and h. timing means operative upon occurrence of each of said time spaces between said sets to increment the display of said messages a distance corresponding to one matrix column width and to increment the display of said messages multiples of said distance upon receipt of said blank data columns.

20. A paging receiver capable of displaying a visual message, comprising:

a. a housing having a physical volume less than ten cubic inches, b. a radio receiver in said housing capable of receiving signals transmitted in digital format, said format including an address code identifying a particular receiver and an alphanumeric message in the form of sets of data pulses, each pulse being representative of the condition of a dot in the column of a matrix, c. means to enable a visual display upon receipt of said address code, d. means to energize said display in response to said message data sets, e. means to index said display in response to the occurrence of blank time spaces after each message data set to present multiple character messages, and f. battery means within said housing for energizing the system.

21. The system of claim 20 wherein said visual display comprises a permanent record display means for said message.

22. The receiver of claim 20 wherein said visual display comprises a nonimpact type printer.

23. The system of the receiver of claim 22 wherein said nonimpact printer comprises a strip of thermally sensitive paper and electrically energizable heating elements for printing a single row of characters extending along the length of the strip of paper.

24. The receiver of claim 20 wherein said visual display comprises means for temporarily displaying said complete message as a single row of characters.

* * * * *

UNITED STATES PATENT OFFICE
CERTIFICATE OF CORRECTION

Patent No. 3,944,724 Dated Mar. 16, 1976

Inventor(s) Jack S. Kilby et al

It is certified that error appears in the above-identified patent and that said Letters Patent are hereby corrected as shown below:

Col. 1, line 36, "have suffer" should be --suffer--.
Col. 9, line 52, before "0" insert --logic--.
Col. 11, line 14, "than" should be --then--.
Col. 14, line 44, "receivied" should be --received--;
line 67, "0,5" should be --0.5--.
Col. 16, line 33,, "356A-358E" should be --358A-358E--.

Signed and Sealed this

Twenty-fourth Day of August 1976

[SEAL]

*Attest:*

RUTH C. MASON
*Attesting Officer*

C. MARSHALL DANN
*Commissioner of Patents and Trademarks*